(12) United States Patent
Xiong et al.

(10) Patent No.: US 11,657,373 B2
(45) Date of Patent: May 23, 2023

(54) SYSTEM AND METHOD FOR IDENTIFYING STRUCTURAL ASSET FEATURES AND DAMAGE

(71) Applicant: Accenture Global Solutions Limited, Dublin (IE)

(72) Inventors: Guanglei Xiong, Pleasanton, CA (US); Neeru Narang, San Jose, CA (US); Anwitha Paruchuri, San Jose, CA (US); Angela Yang Sanford, Oakland, CA (US); Armando Ferreira Gomes, Austin, TX (US)

(73) Assignee: Accenture Global Solutions Limited, Dublin (IE)

( * ) Notice: Subject to any disclaimer, the term of this patent is extended or adjusted under 35 U.S.C. 154(b) by 322 days.

(21) Appl. No.: 16/999,297

(22) Filed: Aug. 21, 2020

(65) Prior Publication Data
US 2022/0058591 A1  Feb. 24, 2022

(51) Int. Cl.
| G06Q 10/20 | (2023.01) |
| G06N 20/20 | (2019.01) |
| G06V 10/75 | (2022.01) |
| G06V 20/13 | (2022.01) |
| G06F 18/214 | (2023.01) |
| G06F 18/2113 | (2023.01) |

(52) U.S. Cl.
CPC ......... *G06Q 10/20* (2013.01); *G06F 18/214* (2023.01); *G06F 18/2113* (2023.01); *G06N 20/20* (2019.01); *G06V 10/751* (2022.01); *G06V 20/13* (2022.01)

(58) Field of Classification Search
CPC .......... G06Q 10/20; G06N 20/20; G06N 3/08; G06V 10/751; G06V 20/13; G06V 20/20; G06V 20/17; G06K 9/623; G06K 9/6256; G06F 18/00; G06T 7/00
See application file for complete search history.

(56) References Cited

U.S. PATENT DOCUMENTS

| 10,346,969 B1* | 7/2019 | Raghu ............... G06V 30/19173 |
| 10,354,386 B1* | 7/2019 | Farnsworth ............ H04N 7/185 |
| 11,030,698 B2* | 6/2021 | Tofte ..................... G06Q 10/06 |
| 11,282,286 B1* | 3/2022 | Chavez .................. G06Q 10/10 |

(Continued)

*Primary Examiner* — Daniel I Walsh
(74) *Attorney, Agent, or Firm* — Plumsea Law Group, LLC

(57) ABSTRACT

The proposed systems and methods describe an autonomous asset detection system that leverages artificial intelligence (AI) models for three-dimensional asset identification and damage detection, asset damage classification, automatic in-field asset tag readings, and real-time asset management. In some embodiments, a deep learning-based system receives a set of aerial images of one or more assets and automatically identifies each asset in the image(s) using rotational coordinates. In some embodiments, an image annotation tool labels the images either manually or automatically. The system then detects whether the asset is damaged and, if so, determine the type of damage, and further captures and stores asset tag information for the target asset. The collected and processed data is then provided to end-users via a comprehensive user interface platform for managing the assets in real-time. The platform can also be configured to generate insights on damage and repair, facilitating an expedited and thoughtful response to asset maintenance.

20 Claims, 13 Drawing Sheets

(56) References Cited

U.S. PATENT DOCUMENTS

| | | | |
|---|---|---|---|
| 11,361,423 B2* | 6/2022 | Toth | G06T 7/0004 |
| 11,392,897 B1* | 7/2022 | Gingrich | G06Q 10/20 |
| 11,430,101 B2* | 8/2022 | Fujita | H04N 5/23299 |
| 11,561,251 B2* | 1/2023 | Schwartz | G01R 31/086 |
| 11,574,395 B2* | 2/2023 | Dev | G06F 30/27 |
| 2017/0206648 A1* | 7/2017 | Marra | G01C 11/00 |
| 2019/0095877 A1* | 3/2019 | Li | G06F 18/217 |
| 2019/0294878 A1* | 9/2019 | Endras | G06T 7/0002 |
| 2020/0034958 A1* | 1/2020 | Campbell | G06T 7/0002 |
| 2020/0074560 A1* | 3/2020 | Xu | G06V 10/40 |
| 2020/0082168 A1* | 3/2020 | Fathi | G06V 20/176 |
| 2020/0098130 A1* | 3/2020 | Porter | G06V 20/182 |
| 2020/0175352 A1* | 6/2020 | Cha | G06N 3/04 |
| 2020/0279364 A1* | 9/2020 | Sarkisian | G06F 16/252 |
| 2020/0357196 A1* | 11/2020 | Zhang | G06K 9/627 |
| 2020/0401138 A1* | 12/2020 | Rentz | G05D 1/104 |
| 2020/0410278 A1* | 12/2020 | Nelson | G06T 7/0002 |
| 2021/0056708 A1* | 2/2021 | Li | G06T 7/187 |
| 2021/0073692 A1* | 3/2021 | Saha | G06Q 10/20 |
| 2021/0081698 A1* | 3/2021 | Lindeman | G06Q 10/20 |
| 2021/0133501 A1* | 5/2021 | Xu | G06K 9/6256 |
| 2021/0174091 A1* | 6/2021 | Doucette | H04N 21/21805 |
| 2021/0174493 A1* | 6/2021 | Xu | G06N 3/0454 |
| 2021/0182713 A1* | 6/2021 | Kar | G06K 9/6281 |
| 2021/0183012 A1* | 6/2021 | Matsumoto | H04N 5/2624 |
| 2021/0192455 A1* | 6/2021 | Larson | G06N 20/00 |
| 2021/0232859 A1* | 7/2021 | Kumar | G06V 10/7796 |
| 2021/0271930 A1* | 9/2021 | Ranca | G06N 3/084 |
| 2021/0272262 A1* | 9/2021 | Horita | G06V 10/761 |
| 2021/0272272 A1* | 9/2021 | Matsumoto | G06T 7/62 |
| 2021/0273003 A1* | 9/2021 | Lan | H01L 27/14649 |
| 2021/0312605 A1* | 10/2021 | Nogami | G06T 7/0004 |
| 2021/0327040 A1* | 10/2021 | Kim | G06T 7/001 |
| 2021/0334995 A1* | 10/2021 | Spence | G06T 7/62 |
| 2021/0342997 A1* | 11/2021 | Malreddy | G06T 7/0004 |
| 2021/0358047 A1* | 11/2021 | Hantehzadeh | G06N 3/0454 |
| 2022/0019190 A1* | 1/2022 | Mohamed Shibly | G01N 29/0645 |
| 2022/0058591 A1* | 2/2022 | Xiong | G06V 10/764 |
| 2022/0084186 A1* | 3/2022 | Ivens | G06Q 10/0832 |
| 2022/0101445 A1* | 3/2022 | Mitchell | G06F 9/4843 |
| 2022/0129682 A1* | 4/2022 | Tang | G06V 20/53 |
| 2022/0129860 A1* | 4/2022 | Nvs | G06T 7/0002 |
| 2022/0164942 A1* | 5/2022 | Dev | G06T 5/002 |
| 2022/0338834 A1* | 10/2022 | Gautam | G16H 50/20 |

\* cited by examiner

SYSTEM AND METHOD FOR IDENTIFYING STRUCTURAL ASSET FEATURES AND DAMAGE

TECHNICAL FIELD

The present disclosure generally relates to the detection of damage in structures. More specifically, the present disclosure generally relates to a system and method for intelligent, autonomous approaches to structural asset management and damage detection using image annotation and machine learning techniques.

BACKGROUND

The inspection, survey, or reconnaissance of structural assets integral to businesses are critical in managing and responding to damage to or interference with the structural assets. For example, the inspection, survey, or reconnaissance of crops or irrigation systems are critical in managing and responding to crop damage and/or equipment malfunctions/deterioration. In another example, the inspection, survey, or reconnaissance of solar panels, windmills, cell towers, and utility assets (e.g., utility towers) are critical in managing and responding to outages and equipment deterioration. Regarding towers and other utility assets, some problems that regularly occur in power transmission lines include insulator contamination from external elements such as salt, pollution, avian waste, or cumulative partial discharge, as well as tower corrosion or avian nesting, lightning strike damage on shield wires or surge arrestors, and incursions by vegetation growth or man-made structures.

Traditional structural asset inspections rely heavily on manual inspections, which require a large investment of manpower, resources, and time. However, with the extremely large coverage areas of structures, such as utility assets, and diverse needs for different environments, manual inspections have remained an inefficient approach for detecting, managing, and responding to damage. In addition, these traditional inspections must rely on human observations, which can vary widely based on the experience and expertise of the observer. As one example, an observer cannot offer a reliable quantitative analysis of the asset and its relative condition, leading to lower accuracy.

There is a need in the art for a system and method that addresses the shortcomings discussed above.

SUMMARY

The present disclosure generally relates to the detection of damage in structural assets. Non-limiting examples of structural assets include crops, irrigation systems, solar panels, windmills, cell towers, and utility assets (e.g., utility towers). To provide a better understanding of the disclosed system and method, the disclosure provides non-limiting examples related to utility asset management (UAM). UAM refers to the process of identifying and maintaining various remote assets held by a utility industry, company, or other such service provider. For example, electrical utility assets typically include utility-size transformers, insulators, arrestors, bushing, switches, capacitors, fuses, poles, manholes, vaults, etc. However, UAM has remained a challenging field, requiring a heavy investment of time, money, and human resources. Furthermore, asset record discrepancies are a common issue among electric utilities, where a record in a repository does not match what actually exists in the field on the asset or attribute level. Some non-limiting examples include missing records for assets in the field, duplicate or false records for assets that are no longer in the field, and records that include missing or incorrect attributes. These discrepancies can result in safety, reliability, financial, and compliance issues for the public, customers, and employees of the utility companies. In addition, record discrepancies slow down grid modernization initiatives as many of these efforts rely on data stored in existing databases, such as optimal long-term system planning and renewable integration. Unfortunately, manual cross-checking of the data with the goal of minimizing such discrepancies is an inefficient and time-consuming process.

To address these and other structural asset-related issues, the proposed systems and methods describe an autonomous asset detection system that leverages artificial intelligence (AI) models for three-dimensional asset identification and damage detection, asset damage classification, automatic in-field asset tag readings, and real-time asset management. In some embodiments, a deep learning-based system receives a set of aerial images of one or more assets and automatically identifies each asset in the image(s) using rotational coordinates. In some embodiments, an image annotation tool labels the images either manually or automatically. The system then detects whether the asset is damaged and, if so, determine the type of damage, and further captures and stores asset tag information for the target asset. The collected and processed data is then provided to end-users via a comprehensive user interface platform for managing the assets in real-time. The platform can also be configured to generate insights on damage and repair, facilitating an expedited and thoughtful response to asset maintenance. This approach can be used to remotely conduct asset reviews and address asset issues before catastrophic failure and streamline the inspection process. Artificial intelligence (AI) models are incorporated to ensure the platform continues to learn and evolve by leveraging reviewer inputs and feedback. Thus, embodiments of the proposed systems are configured to offer several advantages over conventional systems, including automated analysis of images from different resources using developed AI models, significant reductions in outages related to assets, improved compliance with regulatory agencies, and substantial cost reductions.

In one aspect, the disclosure provides a method of detecting and identifying structural asset features and damage may include receiving images of structural assets. The images may each include at least one rotational bounding box surrounding at least one structural asset. The rotational bounding box may be oriented with at least two parallel lines running parallel to a longitudinal axis of the at least one structural asset. The method may include receiving predefined metadata features of a first set of assets. The method may include using a feature extraction model to extract identifying features from the images. The feature extraction model may comprise a first machine learning model trained using a first set of images to extract image-based features from the images, including features of the rotational bounding box. The method may include concatenating the identifying features extracted by the feature extraction model together with the predefined metadata features of the first set of assets through fully connected layer and then processing the same through a Softmax layer to identify the structural assets and damage to the structural assets shown in each images of structural assets.

In another aspect, the disclosure provides a non-transitory computer-readable medium storing software comprising instructions that may be executable by one or more device processors to detect and identify structural asset features and damage by: (1) receiving images of structural assets, the images each including at least one rotational bounding box surrounding at least one structural asset, wherein the rotational bounding box is oriented with at least two parallel lines running parallel to a longitudinal axis of the at least one structural asset; (2) receiving predefined metadata features of a first set of assets; (3) using a feature extraction model to extract identifying features from the images, the feature extraction model comprising a first machine learning model trained using a first set of images to extract image-based features from the images, including features of the rotational bounding box; and (4) concatenating the identifying features extracted by the feature extraction model together with the predefined metadata features of the first set of assets through a fully connected layer and then processing the same through a Softmax layer to identify the structural assets shown in each image.

In another aspect, the disclosure provides a system for detecting and identifying structural asset features and damage that includes a device processor and a non-transitory computer readable medium storing instructions that may be executable by the device processor to: (1) receive images of structural assets, the images each including at least one rotational bounding box surrounding at least one structural asset, wherein the rotational bounding box is oriented with at least two parallel lines running parallel to a longitudinal axis of the at least one structural asset; (2) receive predefined metadata features of a first set of assets; (3) using a feature extraction model to extract identifying features from the images, the feature extraction model comprising a first machine learning model trained using a first set of images to extract image-based features from the images, including features of the rotational bounding box; and (4) concatenate the identifying features extracted by the feature extraction model together with the predefined metadata features of the first set of assets through a fully connected layer and then process the same through a Softmax layer to identify the structural assets shown in each image Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
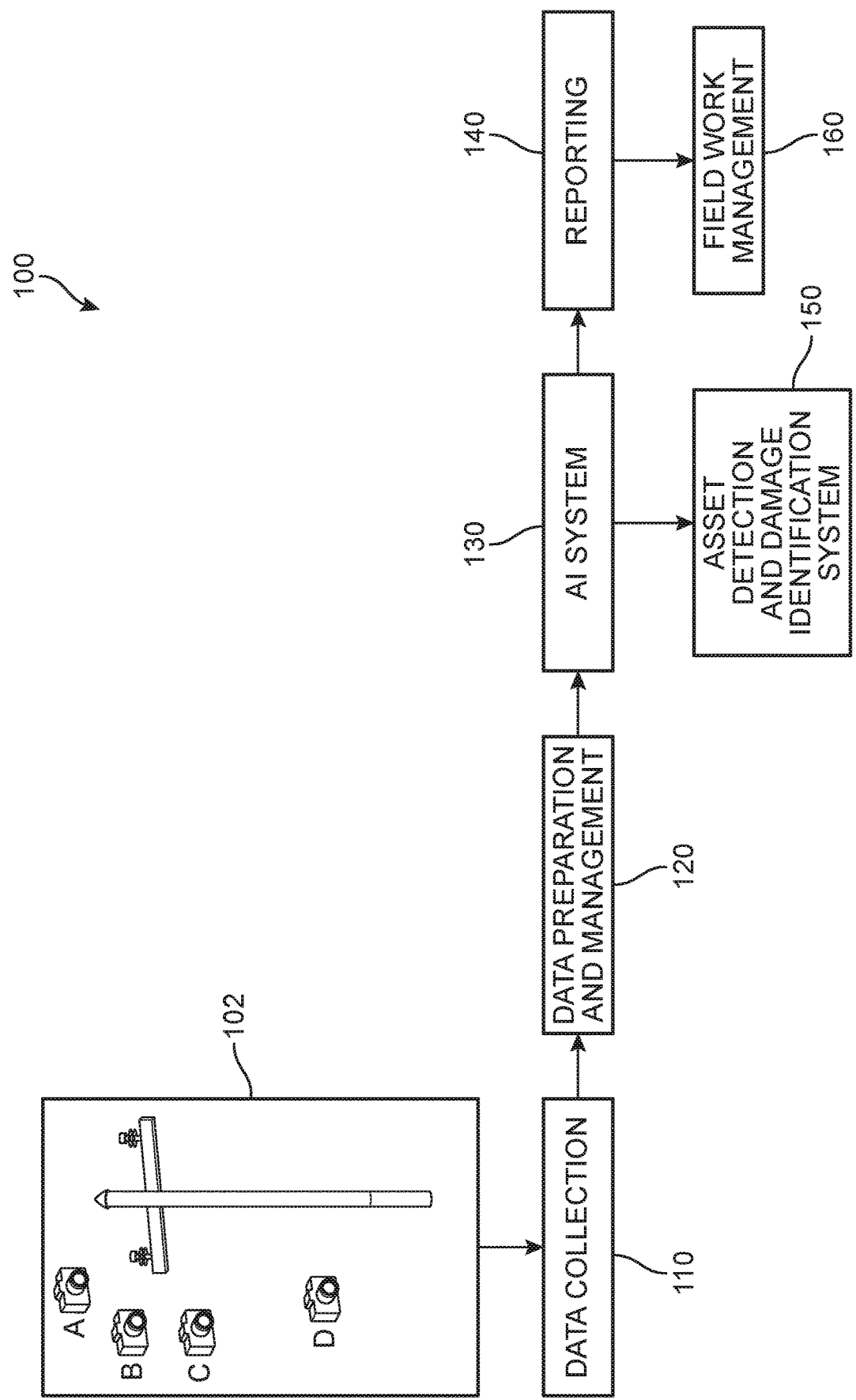
FIG. 1 is a schematic diagram of an embodiment of an asset management flow process.

As will be discussed in detail below, aspects of the proposed systems and methods may be incorporated to provide a highly effective asset management architecture. In some embodiments, the imagery obtained and processed by the system will be collected by aerial vehicles (AVs). For purposes of this disclosure, AVs refer to any kind of plane, helicopter, drone, or other flying vehicles. In some embodiments, an aerial vehicle is remotely operated or programmed ("unmanned aerial vehicles" or UAVs), though in other embodiments, the AV can be piloted. A UAV may take off, navigate, capture data, transmit collected data, return, and land without human interaction. The UAV's movement and data control system may include a hardware implemented mission controller that is to perform various operations related, for example, to mission planning, movement planning, and receiving of data.

In addition, the AV will include one or more sensors configured to gather data associated with a mission. The sensor(s) may include a variety of types of sensors that may be categorized as sight sensors, sound sensors, touch sensors, smell sensors, position sensors, external communication sensors, and other (e.g., miscellaneous sensors). The sight sensors may include sensors for ascertaining light intensity, color, distance (e.g., by infrared (IR), measuring angle of light bounce), video capture, rotation (e.g., optical encoders), and/or light signal read (e.g., infrared codes), and may include LIDAR, digital cameras, infrared cameras, and filters/preprocessing devices. The sound sensors may include sensors (e.g., a microphone) for ascertaining volume (e.g., decibel meter), frequency measurement, and/or distance (e.g., sonar, measuring time to echo). The touch sensors may include sensors for ascertaining position awareness (e.g., collision alert, contact confirmation, etc.), bend/strain, temperature, and/or pressure (e.g., barometric, grip strength, etc.). The smell sensors may include sensors such as gas sensors, alcohol sensors, etc. The position sensors may include sensors (e.g., accelerometer, digital compass, gyroscope) for ascertaining location (e.g., based on global positioning system (GPS), proximity to a beacon, etc.), and/or tilt. The external communication sensors may include sensors for ascertaining radio communication, and/or IR codes. The miscellaneous sensors may include sensors for ascertaining date and time (e.g., ultra-low frequency (ULF) updates), network communication status, and/or voltage (e.g., low fuel, low battery).

In addition, a AV may also include various components for processing, and generating outputs, such as sensor data processing for analog and digital input/output (I/O), kinematics (e.g., position and orientation of objects), proportional-integral-derivative (PID) feedback control, rules application (e.g., if this, do that), navigation (e.g., move to a waypoint), mission execution (e.g., manage multiple waypoints), telemetry management (e.g., summarizing telemetry data), counter, audio/voice processing (e.g., speech to text, text to speech), manage date/time, and data management (e.g., memory, disk, etc.). With respect to processing, the AV may provide for outputs such as movement, motors (e.g., servos, stepper, brushless), hydraulics, pneumatics, gravity release, visual indicators/feedback, LEDs, LCDs, displays, audio indicators/feedback, speaker, buzzer, etc., voltage change (e.g., not in use, go to low power mode), and external communication subsystems (e.g., radio, IR codes).

As will be described in greater detail below, the images of assets collected by AVs can then be provided as input to a sophisticated machine learning model that can accurately isolate and identify the specific asset with a rotational view (e.g., generating a bounding box around the asset that is oriented to minimize the presence of noise around the asset) under challenging environment conditions and at different scales. This is in contrast to conventional machine learning models that may be capable of detecting some assets, but such detection occurs without rotation (e.g., limited to vertical and horizontal bounding boxes) and under controlled environment conditions.

The disclosed systems and methods are configured to optimize asset management operations. Referring to FIG. 1, for purposes of introduction, a high-level overview of an asset management system flow 100 is depicted. In general, the asset management process can be defined by four key stages, including a (1) first stage 110 (data collection), (2) second stage 120 (data preparation and management), (3) third stage 130 (AI system), and (4) fourth stage 140 (reporting). During the first stage 110, the AV(s) captures data around towers and power line paths, among other assets. The AV will be able to expeditiously track and collect information for a large volume of assets, and link each image to its geographic location. In some embodiments, the AV will arrive near or around a target asset and capture multiple images at a variety of positions having different angles and/or distances with respect to the target asset. Images taken at a variety of positions can help provide views of assets from different perspectives, such that identifying features or damage hidden in one view will appear in another view. For example, in FIG. 1, image collection is depicted at a target site 102, where each UAV image capture position is represented by cameras posed at locations A, B, C, and D. During the second stage 120, the system manages, preprocesses, and analyzes the incoming data, including storing data, tagging the associated metadata, and/or enabling search, additions, deletions, and updates. The system is also configured to determine which images are relevant at this stage and select those for the record. Sometimes when the camera's distance from the view varies, this causes a difference in scale between images of the same asset. As discussed in more detail below, the AI system is configured to determine the scale of images, such that images can be more accurately analyzed (e.g., comparing features between images that may be in different scale). As discussed in more detail below, the AI system is configured to handle analyzing images taken at different angles.

During third stage 130, the AI system receives the pre-processed data and runs a quality check on the selected images and data. If any data is deemed deficient (i.e., unable to use in analysis), the AI model will reject and remove this data. Furthermore, the AI model includes an asset detection system that implements deep learning models for identifying specific asset component types, e.g., transformers, insulators, and bushing at 150. In addition, the AI system can implement an asset damage detection and identification deep learning model that includes knowledge about each component and the types of damage possible for that component. The model will recognize the damage and assign a damage classification label accordingly (e.g., mild insulator contamination, bell broken to cap, etc.) to the asset at 150. Finally, in fourth stage 140, the system offers an interactive service platform that is configured to present the results generated for each asset, including the asset type, whether damage was detected, and what type of damage exists. The platform further validates and confirms the risk classification. At 160, the platform manages field work by recommending and/or automatically implementing or triggering one or more corrective actions from its knowledge base of available options and/or receives an input from a user that overrides the corrective option.

Figure 2:
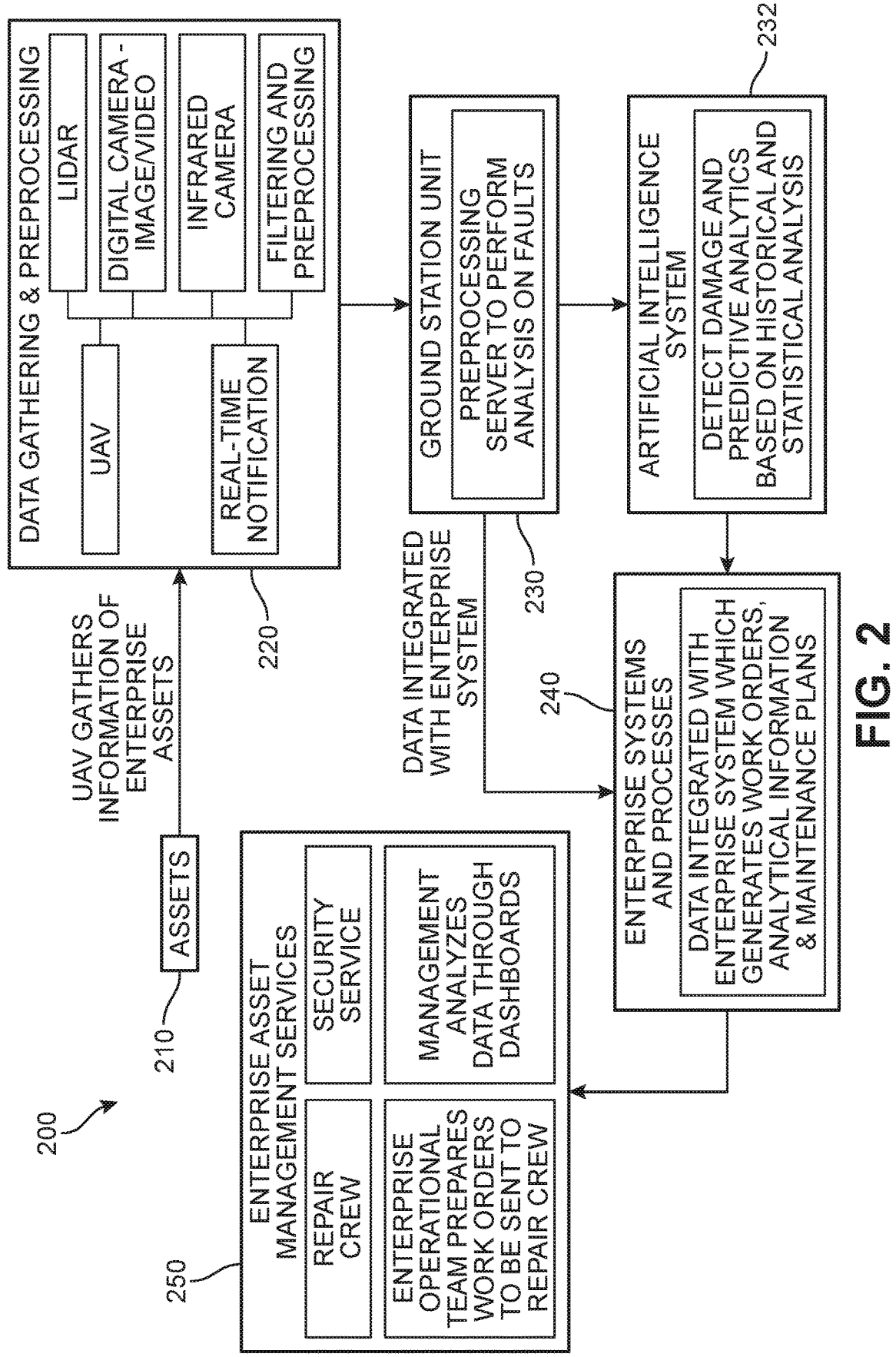
FIG. 2 is a schematic diagram of an embodiment of an intelligent and autonomous asset management environment.

Referring now to FIG. 2, an overview of one embodiment of an asset management system environment ("environment") 200 is presented. Components of environment 200 may interconnect via wired connections, wireless connections, or a combination of wired and wireless connections. Furthermore, such components may utilize cloud computing resources (e.g., memory, bandwidth, random-access memory (RAM), processor, software, etc.) over a network to perform various operations, such as database queries, application program interface (API) calls, computational tasks, and/or the like. A cloud computing environment may provide a static cloud computing resource (e.g., referred to herein as a static cloud computing resource). Additionally, or alternatively, a cloud computing environment may provide a dynamic cloud computing resource (e.g., referred to herein as a dynamic cloud computing resource or a runtime cloud computing resource).

In a first phase 210, the system environment manages the pipeline across multiple use cases. For each use case (e.g., a gas, electricity, or other utility provider) the system engages in a data collection about an entity's assets related to respective use cases. The information can be collected by, for example, by UAVs via various sensors, such as LIDAR, digital image devices, and infrared cameras. The collected data is then filtered and preprocessed during a second phase 220. During a third stage 230, a ground station unit or preprocessing server performs its analysis on the potential faults. This occurs in part by application of an artificial intelligence (AI) system 232, which is configured to detect damage and perform predictive analytics, based at least on historical and statistical analyses.

In different embodiments, the artificial intelligence system 232 is configured to identify the asset type(s) within images of the composite structure, as well as run a classification model to identify the type(s) of damage. In other words, the AI system first classifies the images into different assets, and then, for each asset type detected, the AI system classifies images of the assets by type of damage. Some non-limiting examples of labels that may be assigned to an asset include "INSULATOR_OK", "LOOSE_KEY", "FLASHED_INSULATOR", "WORN_C_HOOK", "CORRODED_CAP", and "BROKEN_BELL". In different embodiments, the AI system is developed, trained, tuned, and evaluated using customized models making use of one or more data science tools for model integration and simulation. In some embodiments, the classification process is configured to, among other thing, execute one or more image classification models built using Deep Learning Open Source Frameworks such as Python callable libraries and other Machine Learning Applications, including Convolution Neural Networks (CNNs) using TensorFlow, Python, Tableau, PyTorch, Keras, Microsoft® CNTK, OpenCV and/or Clarifai API, Custom Image Classification Models, or other similar techniques known in the art, including but not limited to Theano, Torch, Caffe, SciKit-Learn, Accord.NET, Spark MLib, Azure® ML Studio, Amazon® Machine Learning (AML), Google® Vision API, Image Processing and Computer Vision API (Microsoft® Azure), etc.

Such an arrangement allows for real time asset labeling, offline data recording, and regular archiving on the cloud. By use of such customized AI systems, asset detection can be handled with or without rotation, damage classification is performed even for assets in images collected at varying distances, and tags are read from images. In some cases, image analytics processes can make use of any image analytics software, such as Clarifai, Google® Cloud Vision API, Amazon® Rekognition, OpenCV, Microsoft® Computer Vision API, DeepPy, IBM® Watson Visual Recognition, Keras, Deepdream, and others to enable machine learning for training and inference. Furthermore, in some embodiments, the AI system can be deployed and its functions monitored using tools such as Django REST Framework™, Flask™, Amazon Lambda™, Google Kubernetes™, Power BI™, Amazon QuickSight™, Looker™, GCP™, etc.

Figure 8:
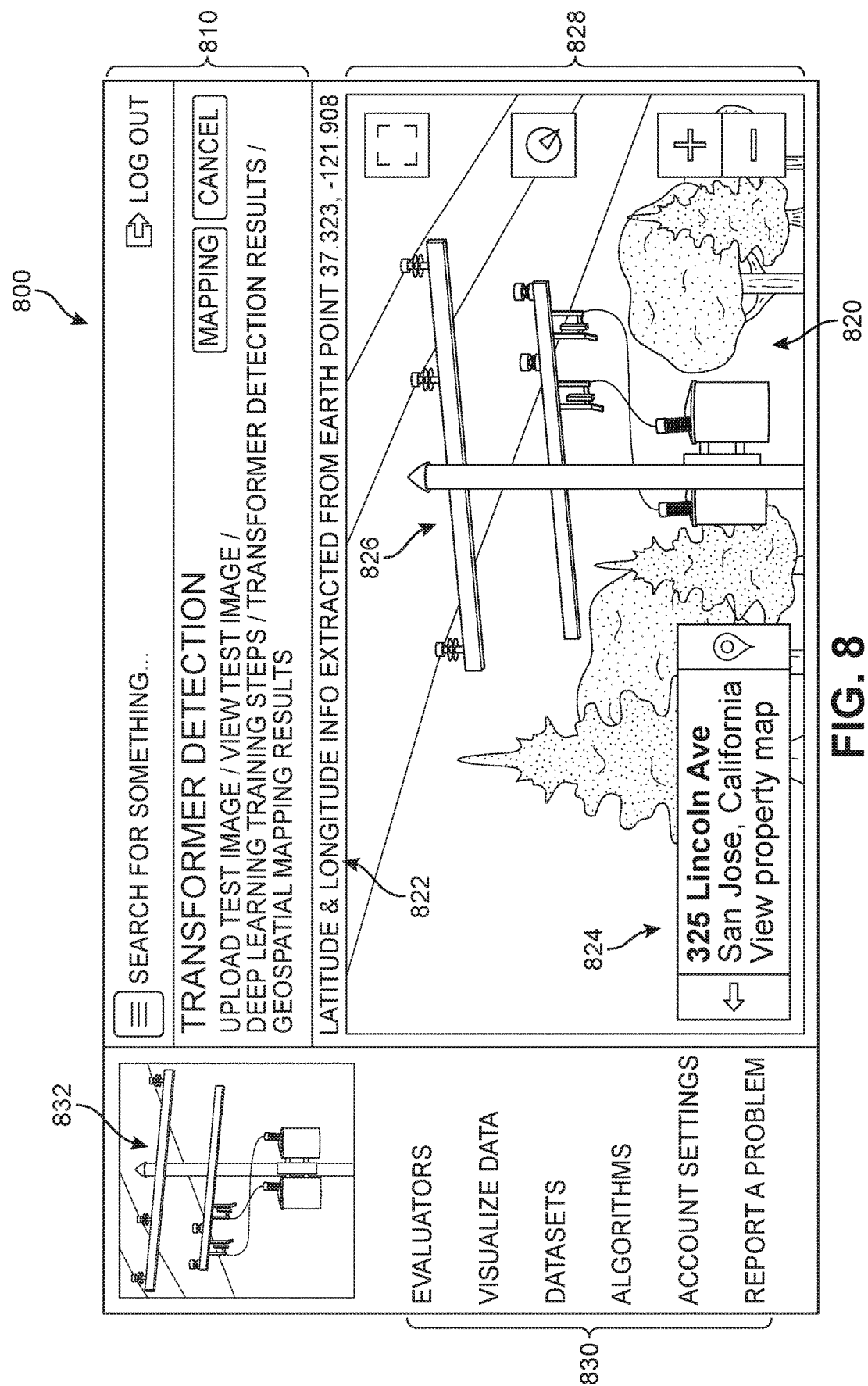
FIG. 8 is a visualization dashboard user interface for identifying asset features and damage, according to an embodiment.

Human inspectors may then optionally verify or modify the system generated classifications and annotations, for example through an intuitive image annotation user interface (e.g., see FIG. 8). The various tools offered by environment 200 to an end-user, such as a visualization subsystem, can be accessed and executed via a user system, where such a system includes one or more devices capable of receiving, generating, storing, processing, and/or providing information associated with analyzing data related to resource utilization. For example, user systems may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. A user system also typically includes one or more user interface devices, such as a keyboard, a mouse, touch screen, pen or the like, for interacting with a graphical user interface (GUI) or visualization dashboard provided by the system on a display (e.g., monitor screen, LCD display, etc.) in conjunction with pages, forms, applications and other information provided by cloud computing resources or other systems or servers.

Thus, in different embodiments, the processed data can be processed and accessed via visualization dashboard platform ("dashboard") to transform the data to a user-friendly presentation of information. The dashboard may provide human operators with user interfaces by which they can interact with the processed data, review raw data and applied classification models, and/or monitor assets in real-time or near-real time. For purposes of this application, an "interface" may be understood to refer to a mechanism for communicating content through an application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through an application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "interface content" refers to content that may be presented in association with a native control in a native application. As some non-limiting examples, interface content may include text in an actuatable pop-up window, audio associated with the interactive click of a button or other native application object, video associated with a teaching user interface, or other such information presentation.

Once reviewed by a user, the human-verified data is saved to an XML file or other data storage file for data manipulation and aggregation by the system. An XML interpreter can be supplied to downstream annotation users. In some embodiments, the model can be configured to receive the human inputs and be retrained using the corrected annotations and classifications, improving model accuracy with each usage session. The output from third phase 230 and the results produced by artificial intelligence system 232 are sent to systems and processes in a fourth phase 240. During the fourth phase 240, the data is integrated with system(s), which then generates work orders, analytical information, and maintenance plans. Finally, in a fifth phase 250, asset management services can be triggered in response to the generated orders, including the deployment of a repair crew and/or security to the site of a damaged asset, additional work orders can be prepared by an operational team to send to the repair crew(s), and/or management can access and further analyze the results through visualization dashboards.

Figure 3A:
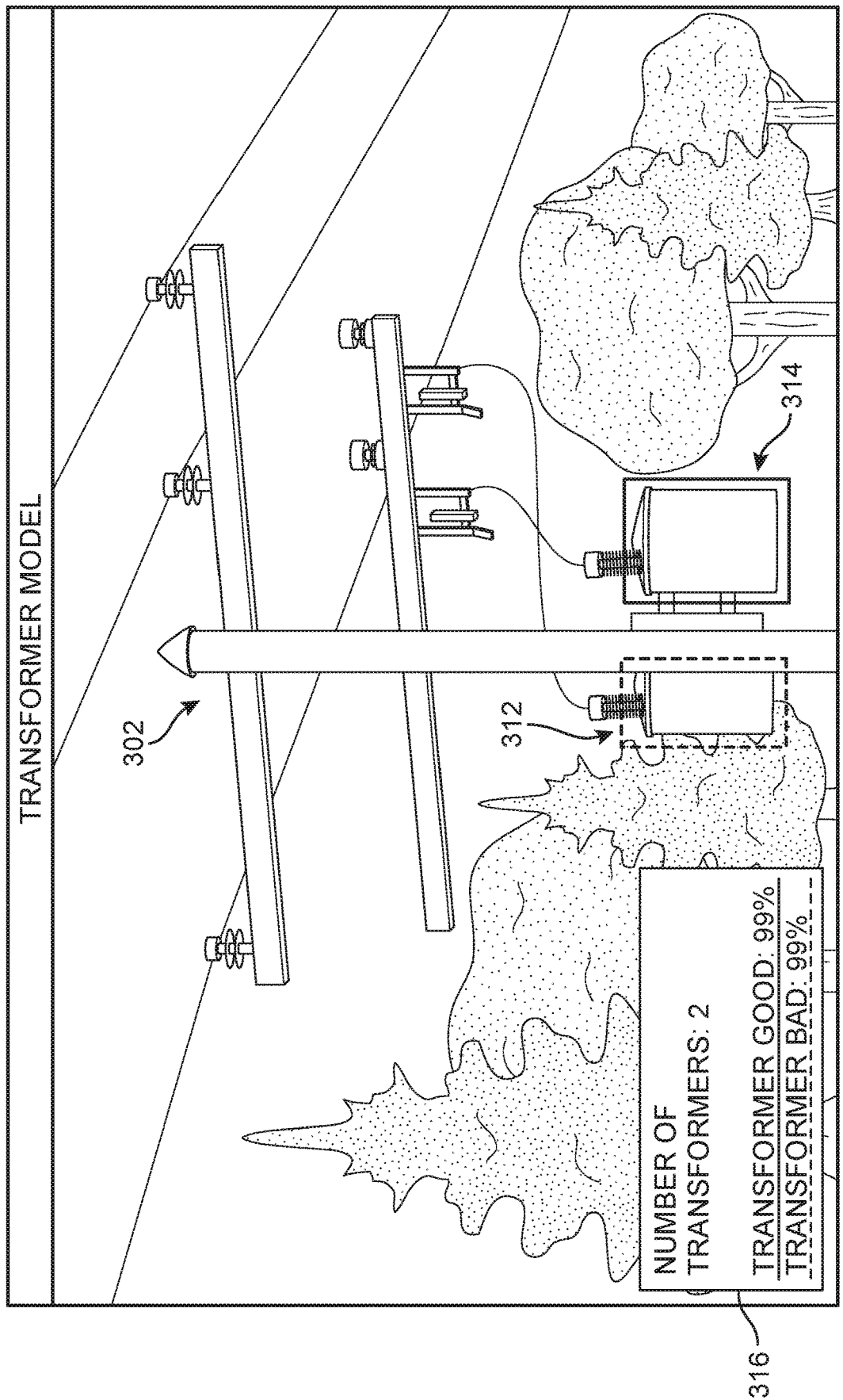
FIGS. 3A-3C are examples of images in which asset identification and damage detection information has been overlaid, according to an embodiment.
Figure 3B:
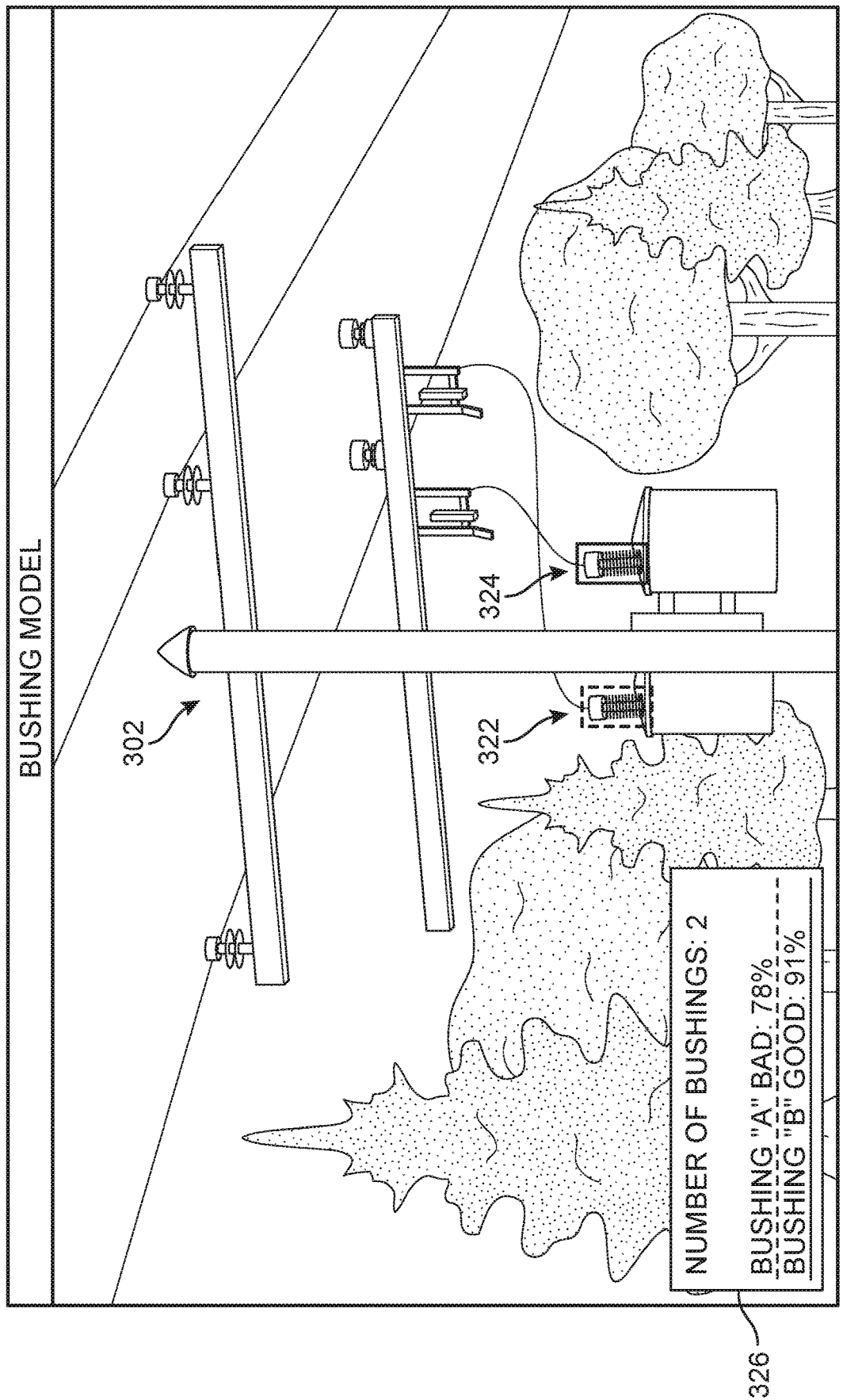
Figure 3C:
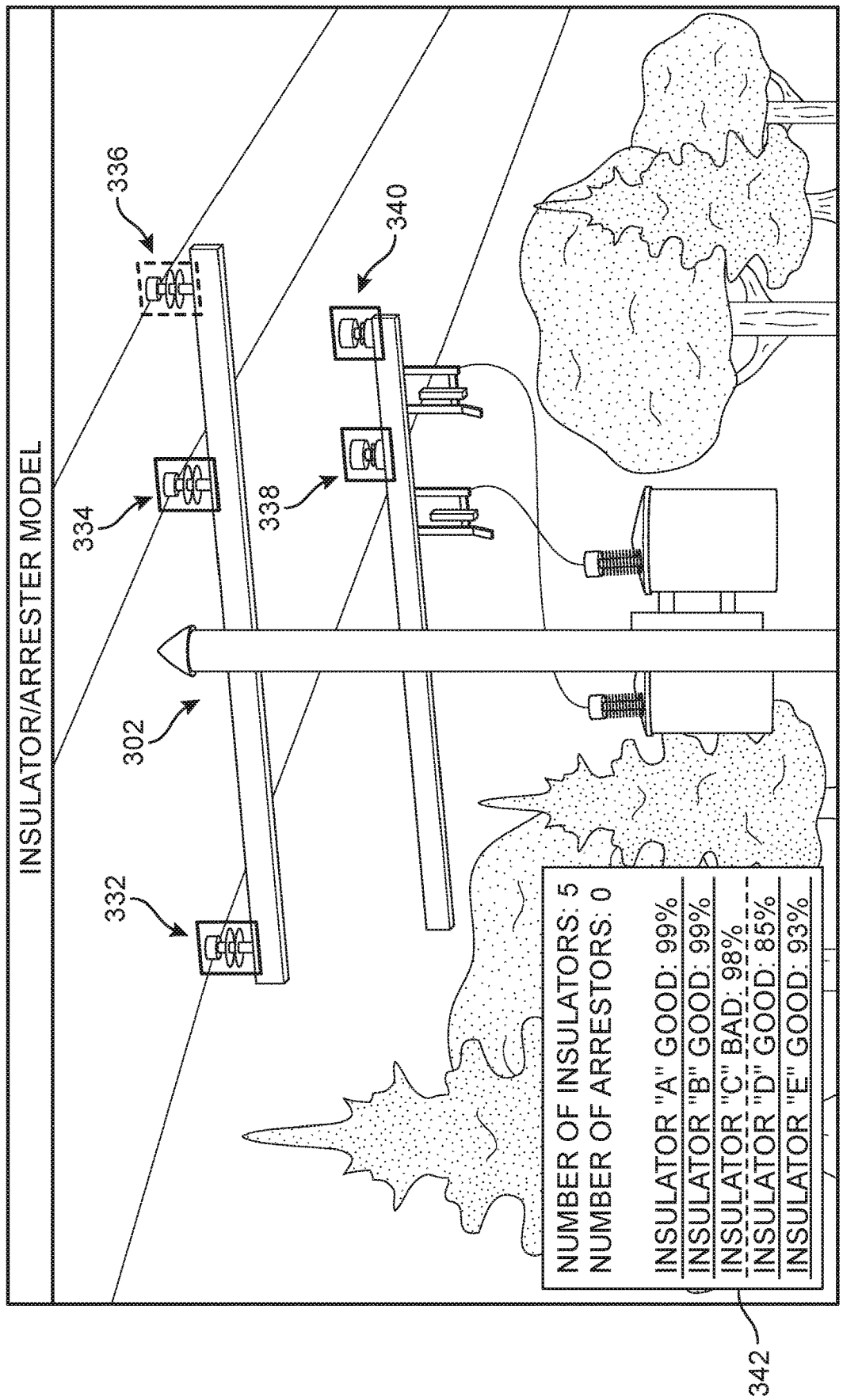

As described herein, the proposed system offers the ability to readily access and view data for each asset. In order to allow the reader to better appreciate the benefits of the proposed system, some examples of annotated images automatically generated by the system are presented with reference to FIGS. 3A-3C. For purposes of illustration, each of FIGS. 3A-3C depict an annotated image of a utility tower 310 that supports a plurality of various utility assets. In the first example of FIG. 3A, the system has implemented a transformer detection and damage model. As a result, a first group of bounding boxes (including a first box 312 and a second box 314) have been overlaid on the image to indicate the location of two transformers that were identified in the image. In this case, the first box 312 is in dotted line to further represent the detection of damage, while the second box 314 is in solid line to represent the absence of damage. Furthermore, a first set of annotations 316 have been generated and assigned to the image ("Number of transformers: 2; Transformer_Good: 99%; Transformer_Bad: 99%") where the percentages correspond to the calculated confidence of the system in the damage classification. In addition, the damaged transformer bounded by first box 312 is linked to the annotation underlined by a dotted line, and the undamaged transformer bounded by the second box 314 is linked to the annotation underlined by a solid line, providing a clear understanding of the distinct data available for each of the two transformers. In other embodiments, different indicators may be used to visualize the processed data, including color-based labels, and/or displaying of annotation and/or other data for a specific target asset in response to a triggering event such as a click on a selected bounding box.

In different embodiments, a single utility tower can include multiple types of assets. In the second example of FIG. 3B, the system has implemented a bushing detection and damage model to examine the utility tower 302. As a result, a second group of bounding boxes (including a third box 322 and a fourth box 324) have been overlaid on the image to indicate the location of two bushings that were identified in the image. In this case, the third box 322 is in dotted line to further represent the detection of damage, while the fourth box 324 is in solid line to represent the absence of damage. Furthermore, a second set of annotations 326 have been generated and assigned to the image ("Number of bushings: 2; Bushing "A"_Bad: 78%; Bushing "B"_Good: 91%") where the percentages correspond to the calculated confidence of the system in the damage classification. In addition, the damaged bushing bounded by third box 322 is linked to the annotation underlined by a dotted line, and the undamaged bushing bounded by the fourth box 324 is linked to the annotation underlined by a solid line, providing a clear understanding of the distinct data available for each of the two bushings.

Similarly, in the third example of FIG. 3C, the system has implemented an insulator and arrestor detection and damage model to examine the utility tower 302. As a result, a third group of bounding boxes (including a fifth box 332, a sixth box 334, a seventh box 336, an eighth box 338, and a ninth box 340) have been overlaid on the image to indicate the location of five bushings that were identified in the image. In this case, only the seventh box 336 is in dotted line to further represent the detection of damage, while the fifth box 332, sixth box 334, eighth box 338, and ninth box 340 are each in solid line to represent the absence of damage. Furthermore, a third set of annotations 346 have been generated and assigned to the image ("Number of insulators: 5; Number of arrestors: 0; Insulator "A"_Good: 99%; Insulator "B"_Good: 99%; Insulator "C"_Bad: 98%; Insulator "D"_Good: 85%; Insulator "E"_Good: 93%") where the percentages correspond to the calculated confidence of the system in the damage classification. In addition, the damaged insulator bounded by seventh box 336 is linked to the annotation underlined by a dotted line, and the undamaged insulators bounded by the fifth box 332, sixth box 334, eighth box 338, and ninth box 340 are linked to the annotations underlined by a solid line, providing a clear understanding of the distinct data available for each of the five insulators.

Figure 4:
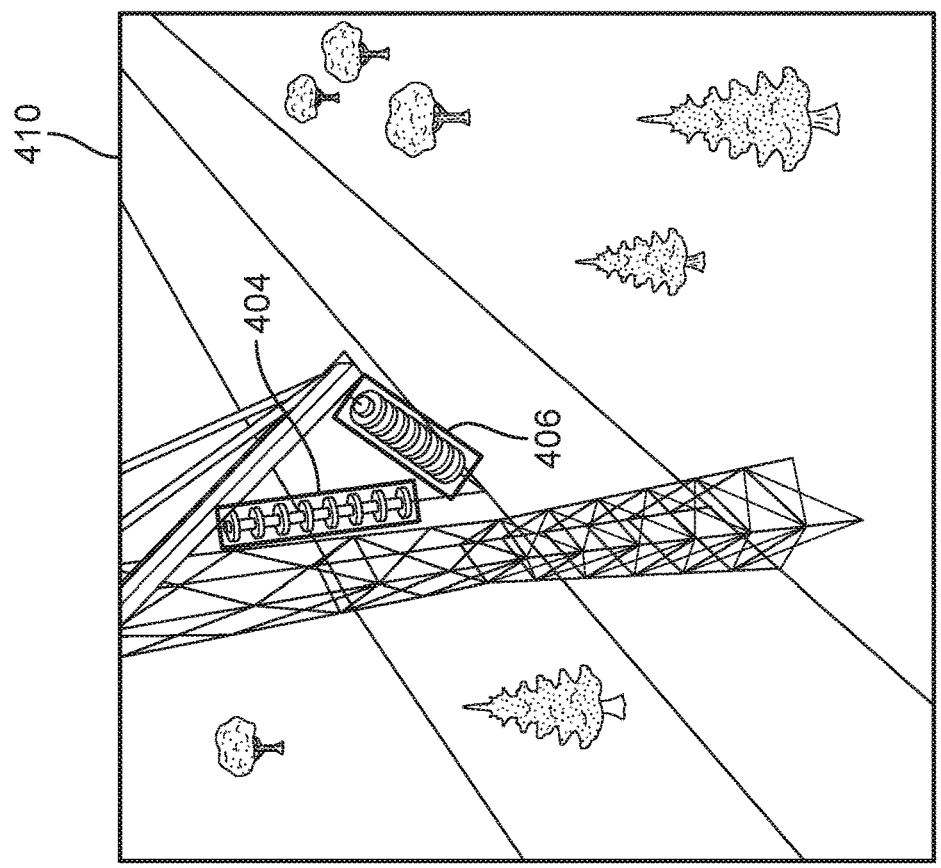
FIG. 4 is an example of images annotated with rectangular and rotational bounding boxes, according to an embodiment.
Figure 4:
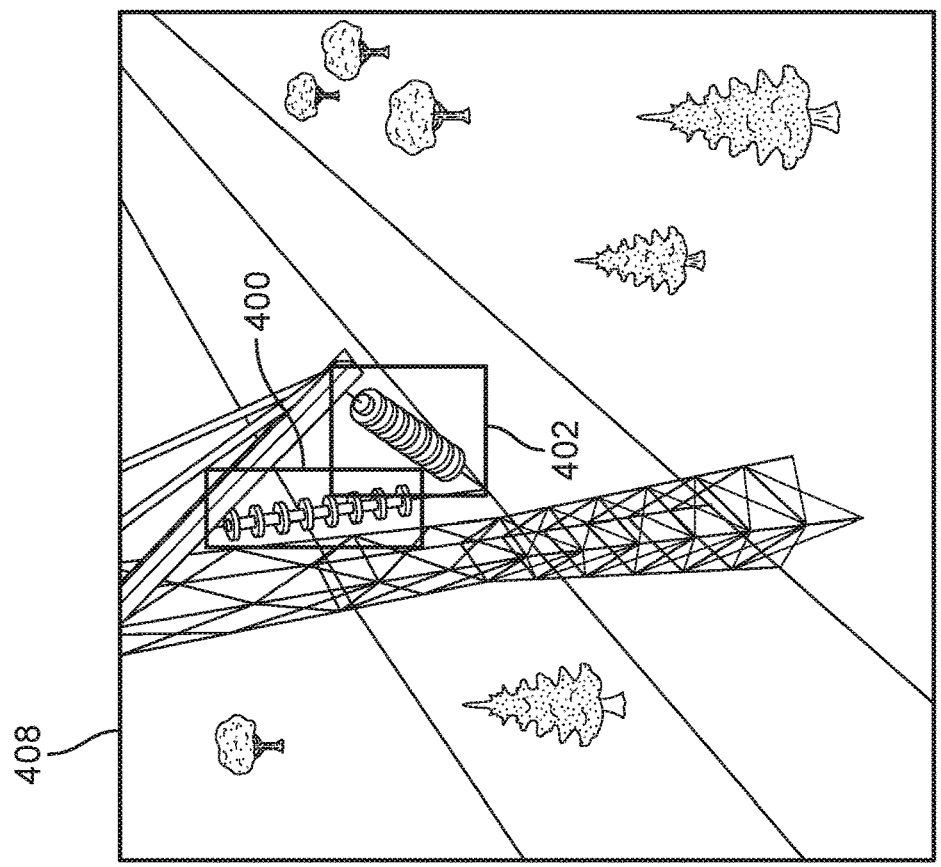

In some embodiments, the images analyzed by AI models of the disclosed system can be accompanied by or include annotations that offer additional data about the assets associated with or expected to be found in each image. In some embodiments, such annotations may be, at least initially, entered manually by the end-user, in order to provide sufficient training data for the model. The annotations can include, for example, rotational bounding box coordinates that are designed to exclude noise and increase the likelihood that only the target asset is captured within the bounding box (i.e., isolate the target asset). Additionally, the features of bounding boxes (e.g., rotational coordinates) may be used to determine the size of an asset in the bounding box. FIG. 4 is an example of images annotated with rectangular and rotational bounding boxes, according to an embodiment. Image 408 shows a first rectangular bounding box 400 and a second rectangular bounding box 402. As shown in image 408, a common problem with rectangular bounding boxes (i.e., bounding boxes that are oriented with the x-y axis of the image) is that they capture more than the target object meant to be captured by the bounding box. Additionally, the rectangular boxes tend to overlap in certain images. As shown in image 408, second rectangular bounding box 402 overlaps with first rectangular bounding box 400, such that both bounding boxes capture the same portion of the object mainly captured by first rectangular bounding box 400. This overlap can cause confusion/errors in image processing.

Image 410 shows a first rotational bounding box 404 and a second rotational bounding box 406. As shown in image 410, rotational bounding boxes (i.e., bounding boxes that are oriented to align with the orientation of the asset) allow for a tighter, cleaner capture of the asset and limits background noise, in contrast to conventional rectangular bounding boxes, which have lower accuracy and often mistakenly cover two assets in one box, leading to data discrepancies. Thus, accuracy and efficiency can be increased by including rotational bounding boxes instead of or in addition to conventional rectangular bounding boxes. As shown in image 410, each rotational bounding box is oriented with at least two parallel lines running parallel to a longitudinal axis of the structural asset in the bounding box and at least two parallel lines running parallel to a latitudinal axis of the structural asset in the bounding box. As shown in image 410, the at least two parallel lines are diagonal with respect to the longitudinal axis of the image. In general, in contrast to rectangular boxes that are defined by only two coordinates corresponding to an upper left corner and a lower right corner of the box (e.g. the following coordinates: $X_1$, $Y_1$,) the rotational bounding boxes are defined by at least four coordinates corresponding to the position of each corner of the box (e.g. the following coordinates: $X_1$, $Y_1$; $X_2$, $Y_2$; $X_3$, $Y_3$; $X_4$, $Y_4$).

Figure 5A:
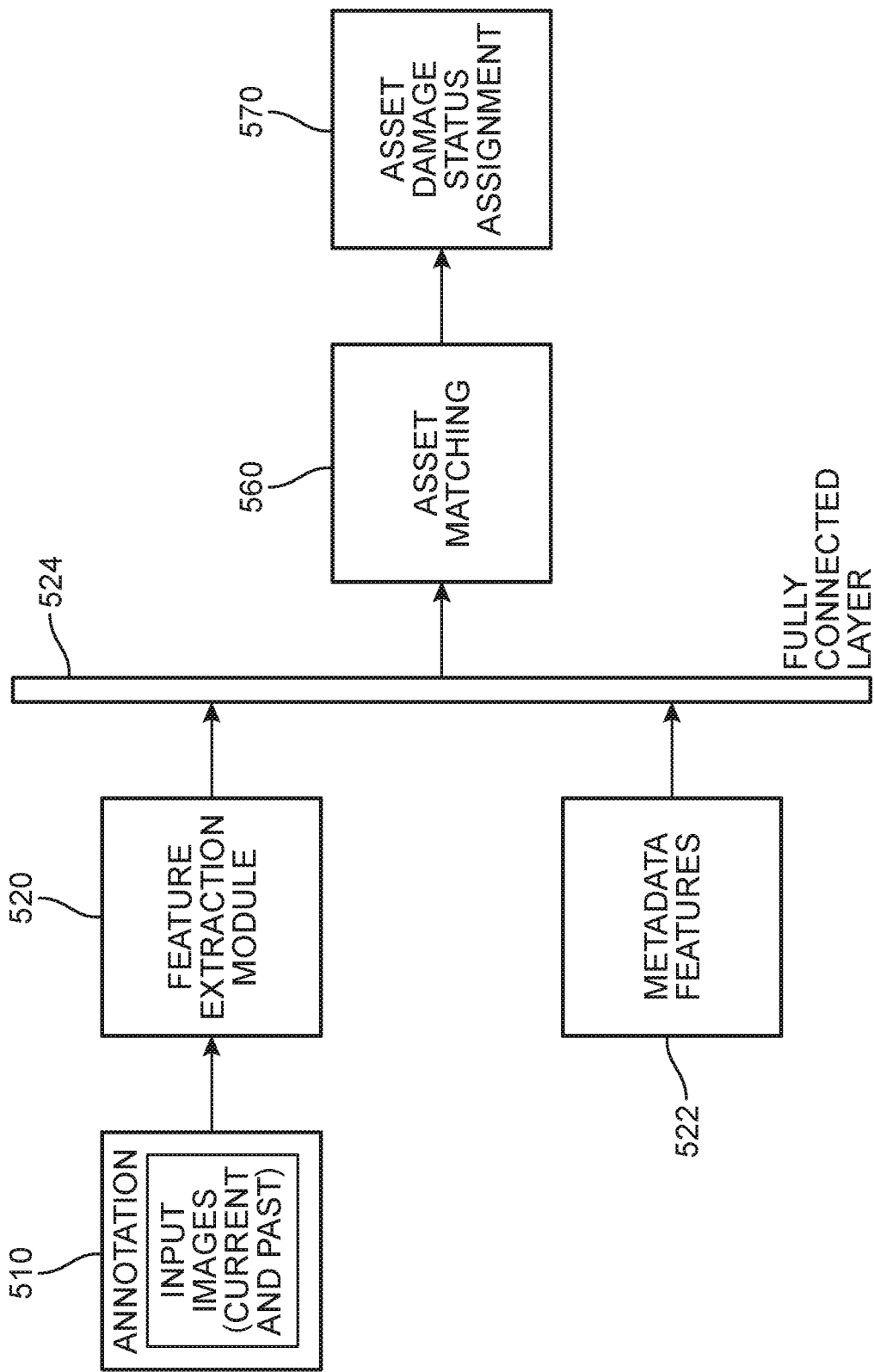
FIGS. 5A-5C are schematic diagrams of a functional architecture for an intelligent AI model for asset identification and damage detection, according to an embodiment.

FIGS. 5A-5C, 6A, 6B, and 7 offer additional insights into the architecture of some of the embodiments of AI models that may be applied by the proposed system. In FIG. 5A, an example of a first model implementation 500 for asset identification and damage detection is depicted. In a first stage 510, a plurality of images is received by the system. The images may include multiple images for a single asset to facilitate three-dimensional asset detection. For example, for each utility pole or tower, 5 images may be captured from different positions around the pole or tower. This approach ensures that damage to the asset that may not be evident or apparent from a first direction/perspective (e.g., occluded by shadows or nearby vegetation) can nevertheless be detected by reference to another image of the same asset from a different angle/direction/perspective. In some embodiments, the images may be captured by an AV and in other embodiments, the images may be captured by cameras held by humans or cameras affixed to other vehicles, e.g., land vehicles, such as unmanned rover vehicles.

As discussed above, the images can be accompanied by or include annotations that may be created manually by a subject matter expert for training. For example, the images may each include at least one rotational bounding box surrounding a structural asset, and the rotational bounding box may be oriented with at least two parallel lines running parallel to a longitudinal axis of the structural asset. The bounding boxes can help increase the efficiency of analyzing images by focusing the analysis on areas where assets are believed to exist in the images. After training has been completed, the system can automatically generate these rotational bounding box coordinates for each asset with reference to a set of images of the target asset taken at different angles.

The annotated images received by the system may be passed to a feature extraction module 520, where the bounding box coordinates define the image area to be analyzed. Feature extraction module 520, which is described in more detail below with respect to FIGS. 5B and 5C, extracts specific features from the annotated images received by the system. The specific features may include identifying features that may be used to identify the type of asset appearing in an image. Metadata features 522 corresponding to particular assets may also be incorporated to extract asset specific features. For example, detecting and identifying structural asset features and structural asset damage may include receiving predefined metadata features of a first set of assets. The first set of assets may include at least a portion of the same assets as those appearing in the images input to the system for processing and/or appearing in the images input to the system for training. The metadata features may include features of assets that are not readily apparent from the images of the assets. The metadata features for a particular asset may be obtained or provided, for example, by manufacturer(s), owner(s), or manager(s) of the asset. In some embodiments, the metadata features may be provided in a report.

The metadata features can, for example, indicate what type of electric pole the asset is attached to, whether is it a transmission or distribution tower, voltage, estimated size of insulators, material comprising the pole (e.g., wood, concrete, lattice, etc.), the texture of the assets, how many assets should be identified at the site, number of insulators on the tower, number of bushings on the tower, number of arrestors on the tower, numbers of transformers on the tower, etc. Such metadata features can be used by the system to determine more specifically the structural asset types, as well as the damage types that are typically associated with the structural assets. For example, including the metadata features with the output from feature extraction module 520 can help provide a high confidence level (e.g., 99.9% or above) for identifying assets from images. This metadata is particularly useful when the structural assets have very different appearances. For example, a transmission tower may have relatively high voltage when compared with distribution towers. Thus, the size of the insulators on a distribution tower may appear much smaller than the size of the insulators on a transmission tower. Since the appearance of insulators in distribution towers may vary so greatly from the appearance of insulators on transmission towers, metadata specific to individual towers can help customize the process of identification beyond mere appearances in images. In some embodiments, metadata features 522 are concatenated with the features extracted from the images (i.e., the output from feature extraction module 520) through a fully connected layer 524 and then the same is processed through a final Softmax layer that represents the total feature set that is used to train the model to identify specific asset types and whether or not the specific asset types in each image are damaged. For example, the following classes may be used to label images:

INSULATOR_OK;
INSULATOR_DAMAGED;
ARRESTOR_DAMAGED; and
ARRESTOR_OK.

Then, the model can be used to identify specific asset types and whether or not the specific asset types in each image are damaged. In other words, the identifying features extracted by the feature extraction model may be concatenated together with the metadata features through a fully connected layer and finally processed through a Softmax layer to identify the structural assets shown in each image.

In some embodiments, in order to ensure a single asset is accurately tracked across multiple images of the asset, an asset matching model 560 can also be incorporated by the system. Asset matching model 560 is configured to receive the concatenated data layer and track the asset across the set of images taken from different angles. For example, an asset similarity, or match score, may be computed for a set of K images $I_1, I_2, \ldots, I_K$ and a set of K assets $A_1, A_2, \ldots, A_K$ which are present in all of the images. To compute this score each pair of images within the set of images $I_1, I_2, \ldots, I_k$ may compared with each other to determine the similarity for each asset appearing in each of the pair of images. When a pair of images containing assets have a high similarity (e.g., at or above a threshold of 98%), the assets having the similarity are considered to be the same asset. For example, if the similarity score for an asset shown in $I_1$ has a similarity of 99% with an asset shown in $I_2$, it may be determined that images $I_1$ and $I_2$ show the same asset $A_1$. The output from asset matching model 560 includes assets and the images showing the assets. Using the previous example, the output could identify that AI appears in both images $I_1$ and $I_2$.

The output from asset matching model 560 is passed thru to an asset damage status assignment model 570, which produces a final asset determination and a binary damage detection decision (e.g., damaged/not damaged, good/bad, etc.). The asset matching model is formulated to capture damage from one angle even if the damage is hidden from other angles. For example, the same asset AI may be shown from different angles/perspectives in images $I_1$ and $I_2$. If at least one of the images shows the asset as damaged with confidence (e.g., at or above threshold of 98%), then the asset ID that identifies the selected asset is classified as having damage. For example, an asset may be identified in each unique image as $A_{ij}$, where i represents the image ID and j represents the asset ID across images. In the same example, if it is determined with confidence that $A_{32}$ shows damage, then the following assets are classified as having damage: $A_{12}, A_{22}, \ldots, A_{N2}$. Damage status assignment model 570 analyzes the output from asset matching model 560 to determine whether any assets are damaged or not and then applies the damage status (e.g., damaged/not damaged, good/bad, etc.) to the other images containing the same assets, as determined by asset matching model 560.

Figure 5B:
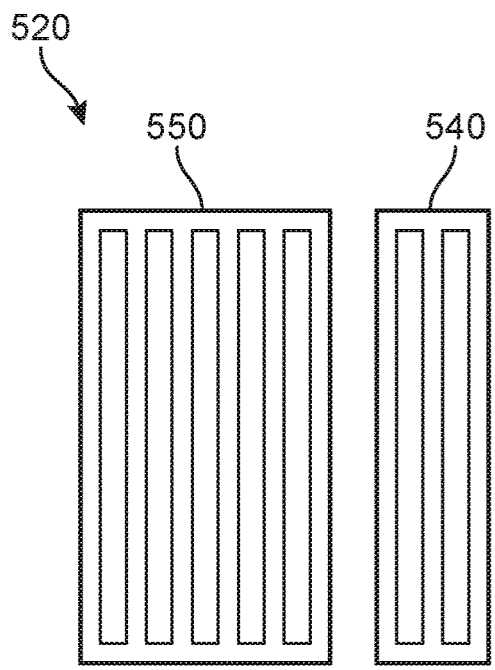

Feature extraction module 520 is shown in more detail in FIG. 5B in which a second machine learning model 550 and a first machine learning model 540 are combined such that the last few layers of second machine learning model 550 are modified by first machine learning model 540. In other words, the last few layers of the first machine learning model are fine-tuned by the second machine learning model. In some embodiments, second machine learning model 550 may include a deep learning model that leverages a pre-trained model (e.g., Inception-RPN). First machine leaning model 540 may be trained by a first set of training images and second machine learning model 550 may be trained using a second set of training images that is different form the first set of training images. In some embodiments, the first training images and/or second training images may include rotational bounding boxes. The first set of training images may show different assets from those shown in the second set of training images. For example, the first set of training images may include old and/or real time images of the same assets appearing in the images being analyzed in a real time. In the same example, the second set of training images may show assets belonging to a different entity than those shown in the first set of training images. The use of two different sets of training images increases variability in features available for extraction. Using a pre-trained model can increase efficiency in training by providing a pre-built foundation that can be customized for identifying particular types of assets. For example, second machine learning model 550 may include a pre-trained model that can be used with its last few layers being modified by adding the features extracted by first machine learning model 540. Using a pre-trained model together with metadata and the second machine learning model can increase the accuracy of asset and/or asset damage identification.

Figure 5C:
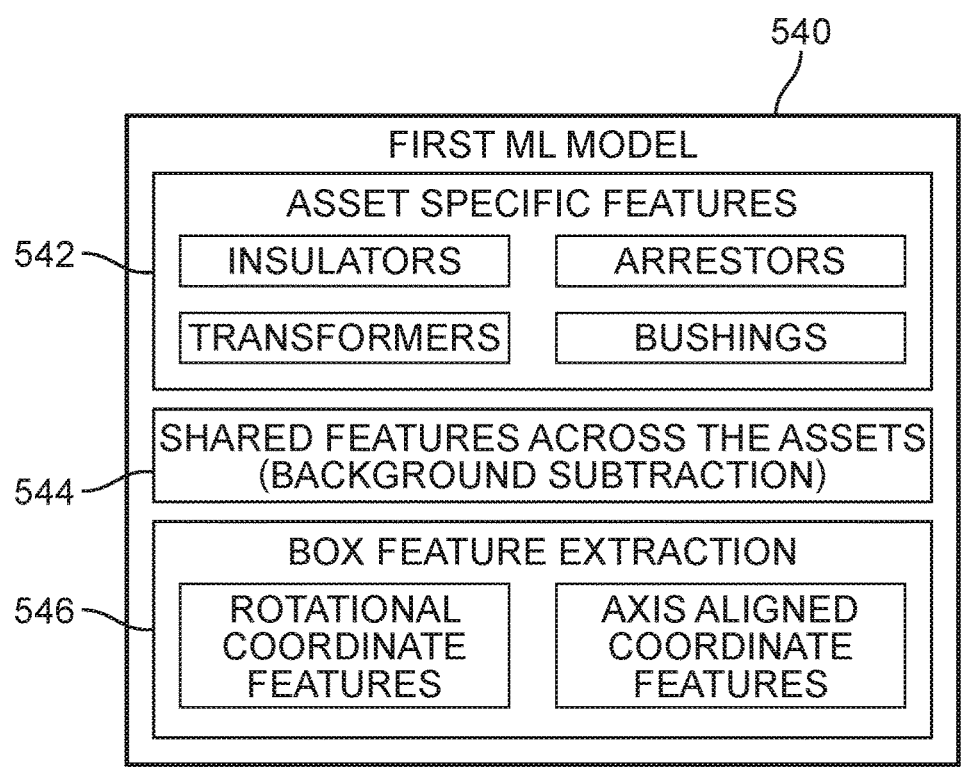

First machine learning model 540 is shown in more detail in FIG. 5C. First machine learning model 540 may include a set of machine learning models that each output a variety of features that can be used to identify an asset. By using a plurality of machine learning models each directed to different features, a wide variety of features can be used during identification, thereby ensuring accuracy in identifying assets and damage to assets. The set of machine learning models included in first machine learning model 540 may include an asset specific features model, a shared features across assets model, and a bounding box feature extraction model. For example, first machine learning model 540 may include asset specific feature model 542, which may extract asset specific features (i.e., features that correspond to specific structural assets). For example, features related to assets, such as insulators, arrestors, transformers, and bushings may be extracted.

First machine learning model 540 may include a shared features across assets layer 544. Shared features across assets layer 544 may extract features shared across assets from images by subtracting the non-asset background from the bounding box. In some cases, detecting a utility asset in a scene is performed as a binary classification task that distinguishes between utility asset object and a background object, based on for example, shape, color, texture, etc., of the asset.

First machine learning model 540 may include a bounding box feature extraction layer 546. Bounding box feature extraction layer 546 may extract rotational features from images and axis aligned coordinate features. The rotational features may include rotational coordinates. For example, the system is configured to calculate inclination information with respect to the axis of image and pass that on as a feature to the model, reducing the likelihood that the selected bounding box includes more than one asset. This process can occur via a deep learning model that was trained based on previously collected images in which the set of four coordinates of the bounding box (e.g., rotational bounding box) is manually annotated by a subject matter expert.

Figure 9:
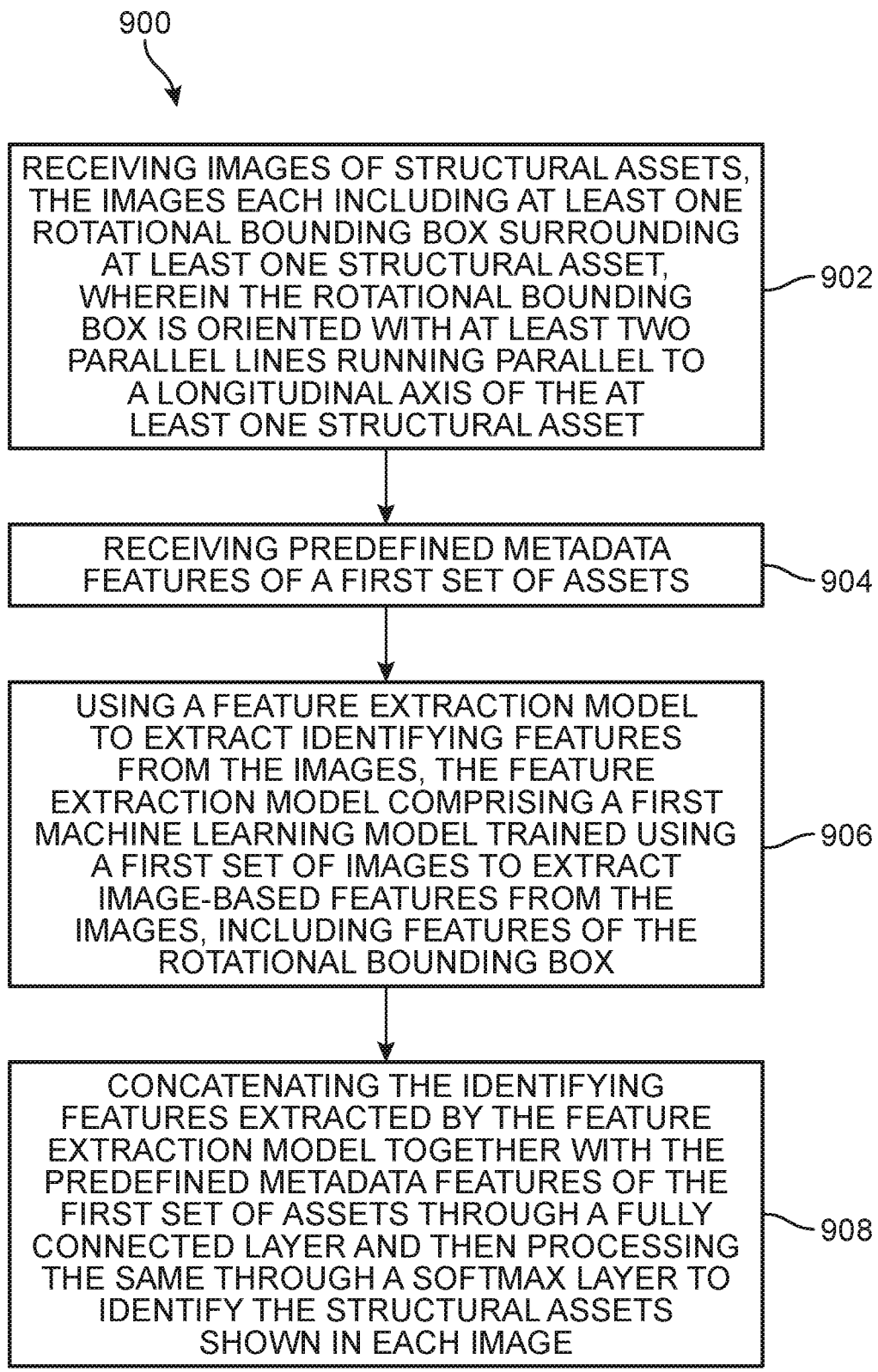
FIG. 9 is a flow chart depicting a method of managing assets, according to an embodiment.

FIG. 9 shows an embodiment of a method of detecting and identifying structural asset features and damage 900 (or method 900). Method 900 includes receiving images of structural assets, the images each including at least one rotational bounding box surrounding at least one structural asset, wherein the rotational bounding box is oriented with at least two parallel lines running parallel to a longitudinal axis of the at least one structural asset (operation 902). For example, the rotational bounding box may look like rotational bounding boxes 404 and 406. Method 900 includes (operation 904) receiving predefined metadata features of a first set of assets. Method 900 includes (operation 906) using a feature extraction model to extract identifying features from the images, the feature extraction model comprising a first machine learning model trained using a first set of images to extract image-based features from the images, including features of the rotational bounding box. For example, the first machine learning model may be first machine learning model 540. Method 900 includes (operation 908) concatenating the identifying features extracted by the feature extraction model together with the predefined metadata features of the first set of assets through a fully connected layer and then processing the same through a Softmax layer to identify the structural assets shown in each image. Operation 908 can further include identifying damage to the identified structural assets in each image.

Figure 6A:
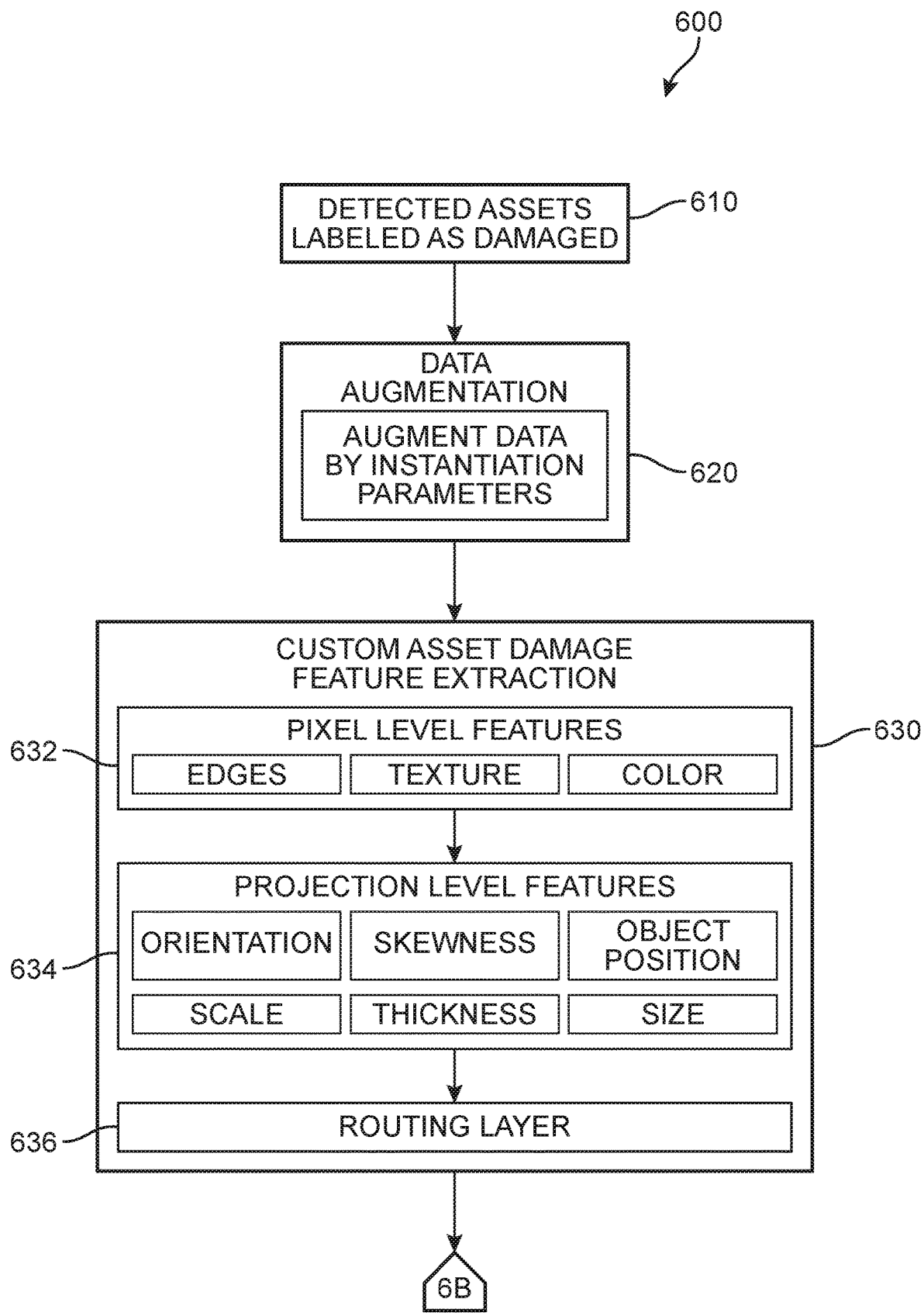
FIGS. 6A and 6B are portions of a schematic diagram of a functional architecture for an intelligent AI model for multi-label asset and damages classifications, according to an embodiment.
Figure 6B:
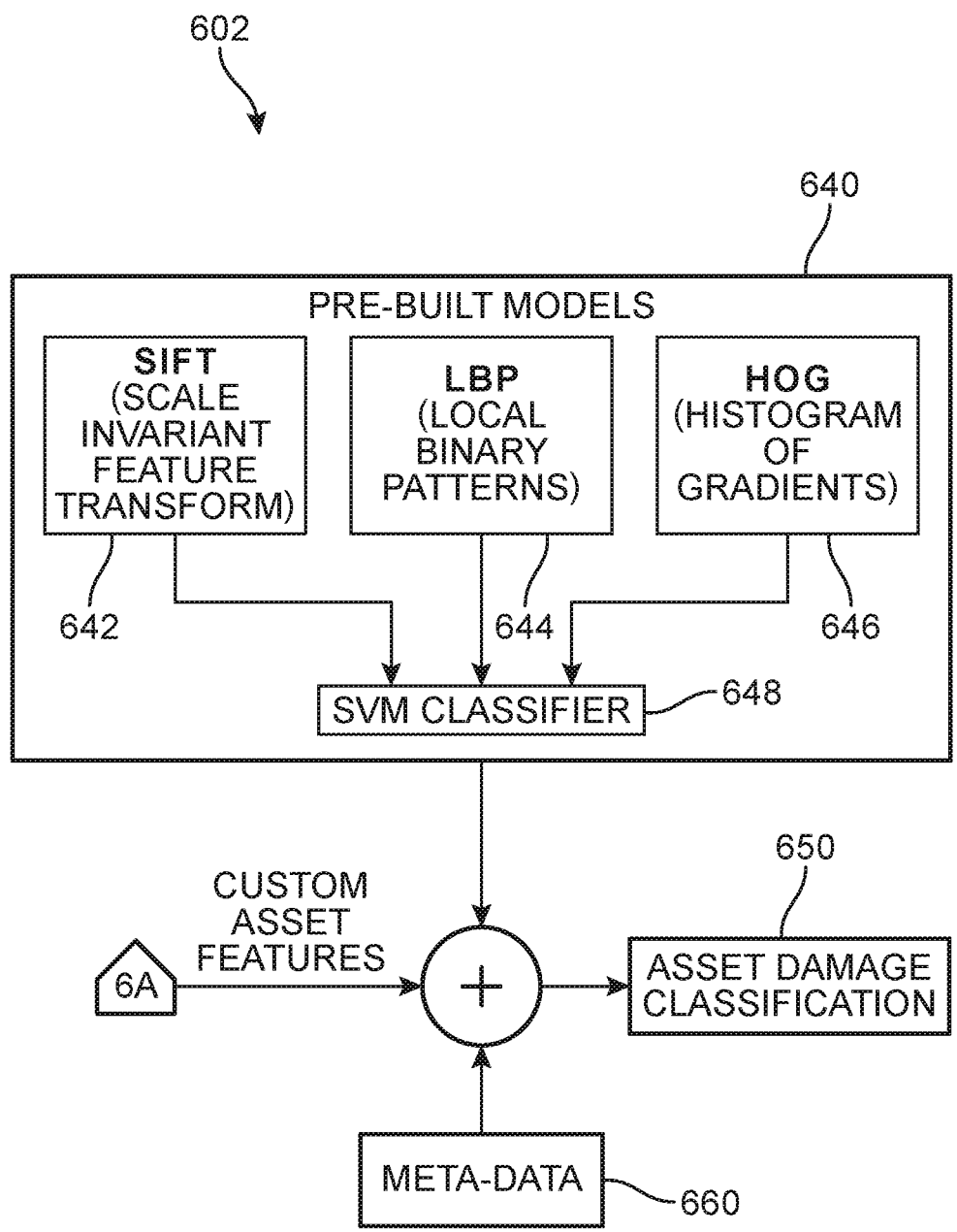

FIGS. 6A and 6B are portions of a schematic diagram of a functional architecture for a machine learning model for multi-label asset and damage classifications 600, according to an embodiment. Images of detected assets labeled as damaged in the process discussed with respect to FIGS. 5A-5C are received and then augmented by augmentation module 620 to produce more training images. The augmentation may be performed using instantiation parameters. The initial images of detected assets labeled as damaged in the process discussed with respect to FIGS. 5A-5C and augmented images may be input into a custom asset damage feature extraction model 630.

In some embodiments, custom asset damage feature extraction model 630 may include a deep learning model. For example, custom asset damage feature extraction model 630 may include a deep learning model trained to extract custom asset features that can be used to identify asset damage types. Custom asset damage feature extraction model 630 may include pixel level features layer 632 and a projection level features layer 634. Pixel level and projection level features can provide local level information for each asset and the models may use these features to identify damage type for different assets. Specifically, pixel level features layer 632 may extract features related to individual pixels (e.g., color, edges, and texture). Projection level features layer 634 may be used to extract features related to projection level (e.g., scale, size, thickness, orientation, position, etc.).

Custom asset damage feature extraction model 630 may include a routing layer 636. Routing layer 636 may route the features in an image to the asset type corresponding to the features extracted by pixel level features layer 632 and projection level features layer 634.

To make the model more robust, the output from custom asset damage feature extraction model 630 and the results from pre-built models 640 may be concatenated with metadata features 660 through a fully connected layer and then the same may be processed through a Softmax layer to classify the type of asset damage appearing in the images input to custom asset damage feature extraction model 630. The pre-built models may include models (e.g., computer reasoning models) each related to different features, such as scale, texture, and orientation. For example, pre-built models 640 may include a scale invariant feature transform (SIFT) model 642, a local binary patterns (LBP) model 644, and a histogram of gradients (HOG) model 646. All of the pre-built models may be input to a support vector machine (SVM) classifier 648 together to enhance accuracy by providing a combination of various features. It is understood that SVM classifier may be another type of classifier other than SVM. It is understood that other types of pre-built models may be used in different combinations. For example, in some embodiments, only a SIFT model and an LBP model are used together. In other embodiments, models other than SIFT models, LBP models, and HOG models may be used with or without SIFT models, LBP models, and HOG models. Metadata features 660 may include similar metadata features to those discussed above and/or may include additional metadata features related to damaged assets. In some embodiments, metadata features 660 may include the type of pole (transmission or distribution), which can help with identification of asset types and/or damage because certain asset types are meant to have specific positions depending on the type of pole. In some embodiments, metadata features 660 may include the type of material (ceramic, glass, porcelain, or composite material). In some embodiments, metadata features 660 may include the design type (puncture arc or flashover arc). In some embodiments, metadata features 660 may include the disc size (3, 4, 6, . . . , 60). In some embodiments, metadata features 660 may include line voltage (34.5, 69, 115, or 765).

As shown in FIG. 6B, the results from custom asset damage feature extraction model 630 and the results from pre-built models 640 may be combined with metadata features 660 to output asset damage classification 650, which includes the types of asset damage appearing in each input image.

Using Custom asset damage feature extraction model 630 together with pre-built models 640 can help prevent inter class variation as well as intra class variation. Inter class variation occurs when the overall pattern and texture of different types of structural assets is similar. For example, bushes and arrestors may have a similar overall pattern and texture. However, the difference between bushes and arrestors exists as location level. Intra class variation occurs when it is difficult to distinguish between assets belonging to the same class. For example, two insulators may be difficult to distinguish from one another even though they have different characteristics (e.g., voltages the insulators are designed to handle). Additionally, using pre-built models can provide the efficiency of not having to build models from scratch. However, it is understood that the pre-built models could be replaced with a different set of models built using another set of custom features.

Figure 7:
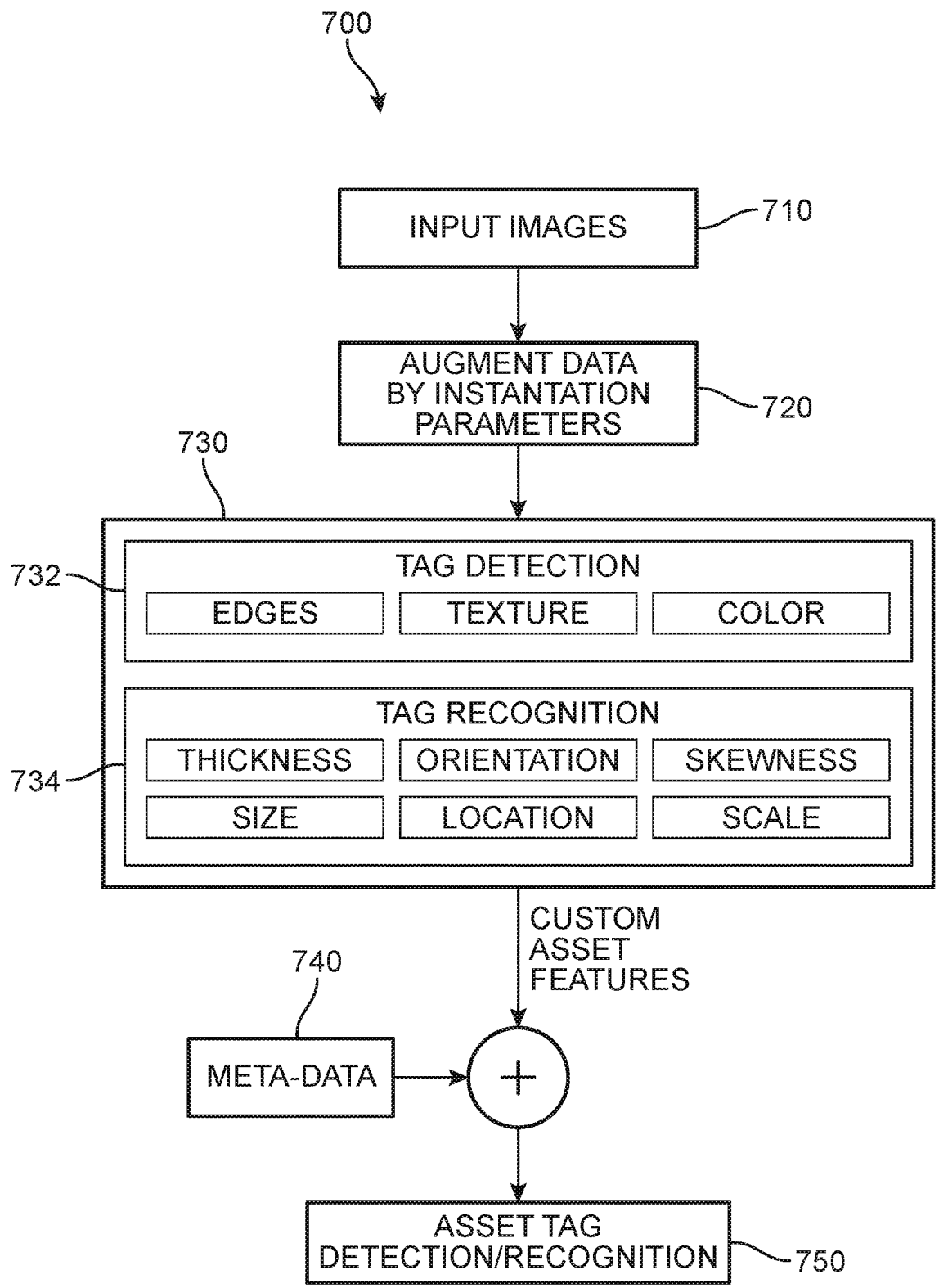
FIG. 7 is a schematic diagram of a functional architecture for an intelligent AI model for reading asset tags, according to an embodiment.

FIG. 7 is a schematic diagram of a functional architecture 700 for an asset tag reading machine learning model 730, according to an embodiment. In some situations, metadata does not have information about the actual tags on assets. Many utility assets include tags that indicate certain features about the assets. For example, tags on insulators may indicate voltages the insulators are designed to handle. The information provided by tags can help provide information useful when making repairs. For example, tags can provide information about the level of current running to a utility pole. Knowing the transformer voltage shown on a tag can help with balancing the rest of the grid that the pole belongs to.

To obtain information that is not available in metadata, the features of the utility tags (e.g., exhibiting numbers and/or letters) shown in images may be analyzed to help identify the missing information. Asset tag reading machine learning model 730 may include a tag detection layer 732 and a tag recognition layer 734. In some embodiments, tag detection layer 732 may extract features that can be used to detect tags. For example, tag detection layer 732 may extract the edges, texture, and color from images to detect tags. Tag recognition layer 734 may be used to extract features that can be used to recognize tags (e.g., thickness, orientation, skewness, size, location, and scale). As shown in FIG. 7, features extracted by asset tag reading machine learning model 730 may be concatenated with metadata features 740 through a fully connected layer and then the same may be processed through a Softmax layer to identify tags at 750. In some embodiments, metadata features 740 may include the same metadata features discussed above with respect to FIGS. 5A-5C and/or 6A-6B, and/or metadata features related to utility tags. Metadata features 740 may include information that may be used to identify tags. For example, metadata features 740 may include the type of transformer (e.g., single phase distribution, three phase distribution, etc.). In another example, metadata features 740 may include the type of insulation (e.g., liquid-immersed or dry type). In another example, metadata features 740 may include the number of units (e.g., 1, 2, or 3). In another example, metadata features 740 may include the type of distribution poles (e.g., wood, concrete, or steel). The metadata may include various combinations of information.

Sometimes the view of tags may be obstructed or the angle of the image may not fully show a tag. In some embodiments, a nearest neighbor approach may be used to determine text that cannot be seen in view. In some embodiments, similarity in size may be used by finding a neighboring anchor for the region of interest anchor to determine text that cannot be seen in view.

Once the tags are detected and identified, the tags may be used during maintenance and/or repairs, particularly those stemming from the asset damage detected and identified in the manner discussed above.

In some embodiments, training for image processing may include pulling a subset of images from an image repository within a cloud storage network. A sample labeled dataset may be created from the subset of images. The sample labeled dataset may include labels corresponding to assets included in the subset of images. In some embodiments, the sample labeled dataset may be manually labeled by a subject matter expert. In other embodiments, the sample labeled dataset may be automatically labeled.

An annotation specification set may be created for using custom auto labeling tool. For example, an annotation specification set may include a set of images that are manually labeled by a subject matter expert. These labels may be used as a guide for a custom auto labeling tool that automatically labels newly input images. Newly input images may be submitted to the custom auto labeling tool for labeling. The images labeled by the custom auto labeling tool can be uploaded to a bucket in the cloud storage network.

During image pre-processing for training, augmentation scripts may be used to augment the labeled images. The augmented images may be uploaded to the bucket. During image pre-processing, a data flow pipeline may be used to convert raw labeled image files from Extensible Markup Language (XML) format to comma-separated values (csv) format. The converted image files (which may include training, validation, and test images) may be uploaded to the bucket. In some embodiments, the dataflow pipeline may be further used to generate the format matching the machine learning platform used for model training. For example, the dataflow pipeline may be further used to generate Tensorflow Records for model training.

During model training, one or more artificial intelligence models based on different hyper parameter tuning may be initiated. Output from the training job may be made available in the bucket. The models may be created and then deployed using an AI platform user interface. Each model may be evaluated using a model evaluation matrix (e.g., a confusion matrix). The best model may be selected for deployment. The selected model may be deployed on the AI platform for making predictions.

FIG. 8 is a visualization dashboard user interface 800 (or interface 800) for identifying and displaying asset features and damage, according to an embodiment. Interface 800 is shown as including a control area 810 where the deployed models may be updated to keep current with trends. Interface 800 displays a first image 820 analyzed to identify asset features and damage. First image 820 includes a pole 826 including multiple structural assets. Tools 828 for changing the view of the first image are included on the interface. Interface 800 displays the latitude and longitude information 822 for the location where the images shown were captured. The address 824 representing the area shown in the first image is displayed with the first image. Hyperlinks or buttons 830 may be provided to obtain information about evaluators, visualize data, view datasets, view algorithms, change account settings, and report problems. A second image 832 of the same pole in first image 820 is displayed to provide more understanding of the pole. It is understood that the images shown in FIG. 8 may be modified to display rotational boxes and information about assets in the manner described with respect to FIGS. 3A-3C. The information shown in interface 800 can be shown in real time, such that the information may be used to create maintenance plans in real time.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of detecting and identifying structural asset features and damage, comprising:
controlling an unmanned aerial vehicle (UAV) to fly to a first target site using one or more position sensors;
capturing, via the UAV, an image of a first target site;
receiving, from the UAV and at an artificial intelligence (AI) system, the image;
annotating, at the AI system, the image and generating an annotated image, the annotated image including at least one rotational bounding box surrounding a structural asset comprising a pole-mounted electrical utility device, wherein the rotational bounding box is oriented with at least two parallel lines running parallel to a first longitudinal axis of the structural asset, and the first longitudinal axis is diagonal relative to a second longitudinal axis of the annotated image;
receiving predefined metadata features of a first set of assets;
using a feature extraction model to:
extract identifying features from the annotated image defining color, edges, and texture, the feature extraction model comprising a first machine learning model trained using a first set of images to extract image-based features from the at least one rotational bounding box in the annotated image, and
extract pixel features related to individual pixels in the annotated image;

extract projection level features related to individual pixels in the annotated image defining scale, size, thickness, and orientation using a pre-built scale invariant feature transformation (SIFT) model; and concatenating the identifying features, the pixel features, and the projection features extracted by the feature extraction model together with the predefined metadata features of the first set of assets through a fully connected layer and then processing the same through a Softmax layer to identify the structural asset and damage to the structural asset shown in the annotated image, and sending a repair crew to the first target site to repair the damaged structural asset.

2. The method of claim 1,
further comprising implementing one or more corrective actions including a maintenance plan regarding the structural asset in response to the identification of damage.

3. The method of claim 2, wherein implementing one or more corrective actions further includes generating work orders, which triggers deployment of the repair crew to the site of the damaged structural asset.

4. The method of claim 1, further comprising
determining the types of asset damage appearing in the labeled image.

5. The method of claim 1, further comprising presenting, via a visualization dashboard on a computing device, the annotated image with its identification of the structural asset.

6. The method of claim 1, wherein the first set of the assets includes a bushing, insulator, transformer, arrestor, and switch.

7. The method of claim 6, wherein the predefined metadata features included for each asset in the first set of assets include:
a type and material of an electric pole the asset is attached to,
a voltage of the asset, and
a texture of the asset.

8. The method of claim 4, wherein the types of asset damage include one or more of insulator contamination, broken bell, loose key, worn hook, corroded cap, and a damaged arrestor.

9. A non-transitory computer-readable medium storing software comprising instructions that are executable by one or more device processors to detect and identify structural asset features and damage by:
controlling an unmanned aerial vehicle (UAV) to fly to a first target site using one or more position sensors;
capturing, via the UAV, an image of a first target site;
receiving, from the UAV and at an artificial intelligence (AI) system, the image;
annotating, at the AI system, the image and generating an annotated image, the annotated image including at least one rotational bounding box surrounding a structural asset comprising a pole-mounted electrical utility device, wherein the rotational bounding box is oriented with at least two parallel lines running parallel to a first longitudinal axis of the structural asset, and the first longitudinal axis is diagonal relative to a second longitudinal axis of the annotated image;
receiving predefined metadata features of a first set of assets;
using a feature extraction model to:
extract identifying features from the annotated image defining color, edges, and texture, the feature extraction model comprising a first machine learning model trained using a first set of images to extract image-based features from the at least one rotational bounding box in the annotated image, and
extract pixel features related to individual pixels in the annotated image;
extract projection level features related to individual pixels in the annotated image defining scale, size, thickness, and orientation using a pre-built scale invariant feature transformation (SIFT) model; and
concatenating the identifying features, the pixel features, and the projection features extracted by the feature extraction model together with the predefined metadata features of the first set of assets through a fully connected layer and then processing the same through a Softmax layer to identify the structural asset and damage to the structural asset shown in the annotated image, and sending a repair crew to the first target site to repair the damaged structural asset.

10. The non-transitory computer-readable medium storing software of claim 9,
wherein the instructions are executable by the one or more device processors to implement one or more corrective actions including a maintenance plan regarding the structural asset in response to the identification of damage.

11. The non-transitory computer-readable medium storing software of claim 10, wherein implementing one or more corrective actions further includes generating work orders, which triggers deployment of the repair crew to the site of the damaged structural asset.

12. The non-transitory computer-readable medium storing software of claim 9, wherein the instructions are executable by the one or more device processors to
determine the types of asset damage appearing in the labeled image.

13. The non-transitory computer-readable medium storing software of claim 9, wherein the instructions are executable by the one or more device processors to present, via a visualization dashboard on a computing device, the annotated image with its identification of the structural asset.

14. The non-transitory computer-readable medium storing software of claim 9, wherein the first set of assets includes a bushing, insulator, transformer, arrestor, and switch.

15. The non-transitory computer-readable medium storing software of claim 14, wherein the predefined metadata features included for each asset in the first set of assets include:
a type and material of an electric pole the asset is attached to,
a voltage of the asset, and
a texture of the asset.

16. The non-transitory computer-readable medium storing software of claim 9, wherein the damage includes one or more of insulator contamination, broken bell, loose key, worn hook, corroded cap, and a damaged arrestor.

17. A system for detecting and identifying structural asset features and damage, the system comprising:
a device processor; and
a non-transitory computer readable medium storing instructions that are executable by the device processor to:
control an unmanned aerial vehicle (UAV) to fly to a first target site using one or more position sensors;
capture, via the UAV, an image of a first target site;
receive, from the UAV and at an artificial intelligence (AI) system, the image;
annotate, at the AI system, the image and generating an annotated image, the annotated image including at least one rotational bounding box surrounding a structural asset comprising a pole-mounted electrical utility device, wherein the rotational bounding box is oriented with at least two parallel lines running parallel to a first longitudinal axis of the structural asset, and the first longitudinal axis is diagonal relative to a second longitudinal axis of the annotated image;

receive predefined metadata features of a first set of assets;

using a feature extraction model to:
- extract identifying features from the annotated image defining color, edges, and texture, the feature extraction model comprising a first machine learning model trained using a first set of images to extract image-based features from the at least one rotational bounding box in the annotated image, and
- extract pixel features related to individual pixels in the annotated image;
- extract projection level features related to individual pixels in the annotated image defining scale, size, thickness, and orientation using a pre-built scale invariant feature transformation (SIFT) model; and
- concatenate the identifying features, the pixel features, and the projection features extracted by the feature extraction model together with the predefined metadata features of the first set of assets through a fully connected layer and then processing the same through a Softmax layer to identify the structural asset and damage to the structural asset shown in the annotated image, and send a repair crew to the first target site to repair the damaged structural asset.

18. The system of claim 17,
wherein the instructions are executable by the one or more device processors to implement one or more corrective actions including a maintenance plan regarding the structural asset in response to the identification of damage.

19. The system of claim 17, wherein the instructions are executable by the one or more device processors to
determine the types of asset damage appearing in the labeled image.

20. The system of claim 17, wherein the instructions are executable by the one or more device processors to present, via a visualization dashboard on a computing device, the annotated image with its identification of the structural asset.

* * * * *